(12) United States Patent
Lee

(10) Patent No.: US 9,349,149 B2
(45) Date of Patent: May 24, 2016

(54) POWER MANAGEMENT APPARATUS AND METHOD

(71) Applicant: Samsung Electronics Co., Ltd., Suwon-si (KR)

(72) Inventor: Gye Young Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 432 days.

(21) Appl. No.: 13/670,832

(22) Filed: Nov. 7, 2012

(65) Prior Publication Data

US 2013/0131880 A1    May 23, 2013

(30) Foreign Application Priority Data

Nov. 18, 2011    (KR) .................. 10-2011-0121148

(51) Int. Cl.
| | |
|---|---|
| *G06F 19/00* | (2011.01) |
| *G06Q 50/06* | (2012.01) |
| *G06Q 20/14* | (2012.01) |
| *G01R 11/57* | (2006.01) |
| *G07F 15/00* | (2006.01) |
| *H02J 3/14* | (2006.01) |

(52) U.S. Cl.
CPC .............. *G06Q 50/06* (2013.01); *G06Q 20/145* (2013.01); *G01R 11/57* (2013.01); *G07F 15/003* (2013.01); *H02J 2003/146* (2013.01)

(58) Field of Classification Search
CPC .. G06Q 10/06; G06Q 10/06315; G06Q 50/06

USPC .................................................. 700/291, 295
See application file for complete search history.

(56) References Cited

U.S. PATENT DOCUMENTS

| | | | |
|---|---|---|---|
| 8,359,389 B1* | 1/2013 | Cohen et al. ................... 709/224 |
| 2011/0109472 A1* | 5/2011 | Spirakis et al. .......... 340/870.02 |
| 2011/0145611 A1* | 6/2011 | Lee ................................ 713/320 |
| 2011/0251731 A1* | 10/2011 | Yang et al. ..................... 700/296 |
| 2011/0288905 A1* | 11/2011 | Mrakas ......................... 705/7.25 |
| 2012/0323390 A1* | 12/2012 | Kobayasi ....................... 700/295 |
| 2013/0131880 A1* | 5/2013 | Lee ................................ 700/291 |

OTHER PUBLICATIONS

Board, Ontario Energy. "Smart Meter Implementation Plan." Report of the Board to the Minister (2005).*

(Continued)

*Primary Examiner* — Michael D Masinick
(74) *Attorney, Agent, or Firm* — Staas & Halsey LLP

(57) ABSTRACT

A power management apparatus and method are disclosed. The power management apparatus includes a communication unit to receive power management data including information about a pricing system being used by a consumer of power, a controller to create a power management screen on which the amount of power consumed is displayed according to the pricing system being used by the consumer, and an output unit to output the power management screen. According to the power management apparatus, a power consumer can be provided with information about various electricity pricing systems. Furthermore, information about current power rates and information on current power consumption can be displayed such that the consumer checks the information and efficiently uses power.

21 Claims, 9 Drawing Sheets

(56) References Cited

OTHER PUBLICATIONS

Klawitter, Simone. "A methodical approach to multi criteria sustainability assessment of water pricing in urban areas." in Governance for Industrial Transformation: Proceedings of the 2003 Berlin Conference on the Human Dimensions of Global Environmental Change, Berlin. 2003.*

Wolak, Frank A. "Do residential customers respond to hourly prices? Evidence from a dynamic pricing experiment." The American Economic Review (2011): 83-87.*

Borenstein, Severin. "To what electricity price do consumers respond? Residential demand elasticity under increasing-block pricing." Preliminary Draft Apr. 30, 2009.*

Kenney, Douglas S., et al. "Residential Water Demand Management: Lessons from Aurora, Colorado1." (2008): 192-207.*

Kenney, Doug, et al. "Residential water demand management in Aurora: learning from the drought crisis." Colorado Water (2007): 14.*

* cited by examiner

POWER MANAGEMENT APPARATUS AND METHOD

CROSS-REFERENCE TO RELATED APPLICATIONS

This application claims the priority benefit of Korean Patent Application No. 10-2011-121148, filed on Nov. 18, 2011 in the Korean Intellectual Property Office, the disclosure of which is incorporated herein by reference.

BACKGROUND

1. Field

Embodiments relate to a power management apparatus and method capable of displaying information about various electricity pricing systems.

2. Description of the Related Art

Recently, research on smart grids has been actively performed. A smart grid is an 'intelligent power network' corresponding to a combination of the information technology and a conventional uni-directional power network composed of power generation, power transmission, power distribution and sale stages to allow a power provider and a consumer to exchange information in real-time, thereby optimizing energy efficiency.

The power provider can check a power use state in real time using the smart grid and elastically adjust power supply in response to the power use state. The power consumer can select a time period in which power rates are low and control the quantity of used power by checking the power use state in real time.

As part of the smart grid technology, a power management unit (PMU) has been developed. The PMU is installed in a home of a power consumer, receives information about current power rates from a power provider and displays the current power rates.

However, a conventional PMU displays only the current power rates and generates an alarm only when an electricity price is changed, and thus it is difficult for the power consumer to check current power consumption. In addition, the conventional PMU has difficulty in displaying information about power rates and power consumption with respect to a pricing system in which power rates change in response to power consumption other than real time pricing (RTP)

SUMMARY

In accordance with an aspect of one or more embodiments, there is provided a power management apparatus and method capable of displaying information about various pricing systems.

In accordance with an aspect of one or more embodiments, there is provided a power management apparatus including: a communication unit to receive power management data including information about a pricing system being used by a consumer of power; a controller to create a power management screen on which the amount of power consumed is displayed according to the pricing system being used by the consumer; and an output unit to output the power management screen.

The power management data may include least one of current power rates, a price level corresponding to the current power rates, the pricing system being used by the consumer, the amount of power consumed by the consumer, power rates corresponding to the amount of power consumed by the consumer, average power consumption of the consumer, average power rates of the consumer, and average power rates of a neighbor of the consumer.

The power management screen may include a clock window having an inside part filled depending on the amount of power consumed when the pricing system being used by the consumer is a pricing system in which power rates change in response to power consumption.

The power management screen may further include an information window displaying information about the amount of remaining power available before an electricity price of a next level is applied when the pricing system being used by the consumer is a pricing system in which power rates change in response to power consumption.

A price level corresponding to a current electricity price may be indicated on the edge of the clock window.

A price level corresponding to a current electricity price may be indicated in a fan shape in the inside part of the clock window.

When the amount of power consumed by the consumer exceeds the average power consumption of the consumer, the controller may determine that power is excessively consumed and generates an alarm indicating excessive power consumption.

When the amount of power consumed by the consumer exceeds the average power consumption of a neighbor of the consumer, the controller may determine that power is excessively consumed and generates an alarm indicating the excessive power consumption.

A method of generating the alarm indicating the excessive power consumption may include at least one of an emoticon, pop-up, a sound, a short message service, and e-mail.

When the method of generating the alarm indicating the excessive power consumption uses an emoticon, the controller may display an emoticon in the form of a tree thick with leaves before determining that power is excessively consumed and display an emoticon in the form of a tree having a reduced number of leaves upon determining that power is excessively consumed.

In accordance with an aspect of one or more embodiments, there is provided a power management method including: receiving power management data including information about a pricing system being used by a consumer of power; creating, using at least one processor a power management screen on which the amount of power used so far is displayed according to the pricing system being used by the consumer; and outputting the power management screen.

The power management data may include at least one of current power rates, a price level corresponding to the current power rates, the pricing system being used by the consumer, the amount of power consumed by the consumer, power rates corresponding to the amount of power consumed by the consumer, average power consumption of the consumer, average power rates of the consumer, and average power rates of a neighbor of the consumer.

The power management screen may include a clock window having an inside part filled depending on the amount of power consumed when the pricing system being used by the consumer is a pricing system in which power rates change in response to power consumption.

The power management screen may further include an information window displaying information about the amount of remaining power available before an electricity price of a next level is applied when the pricing system being used by the consumer is a pricing system in which power rates change in response to power consumption.

A price level corresponding to a current electricity price may be indicated on the edge of the clock window.

A price level corresponding to a current electricity price may be indicated in a fan shape in the inside part of the clock window.

When the amount of power consumed by the consumer exceeds the average power consumption of the consumer, the creating of the power management screen may include determining that power is excessively consumed and generating an alarm indicating excessive power consumption.

When the amount of power consumed by the consumer exceeds the average power consumption of a neighbor of the consumer, the creating of the power management screen may include determining that power is excessively consumed and generating an alarm indicating the excessive power consumption.

A method of generating the alarm indicating the excessive power consumption may include at least one of an emoticon, pop-up, a sound, a short message service, and e-mail.

When the method of generating the alarm indicating the excessive power consumption uses an emoticon, the generating of the alarm indicating the excessive power consumption may include displaying an emoticon in the form of a tree thick with leaves before determining that power is excessively consumed and displaying an emoticon in the form of a tree having a reduced number of leaves upon determining that power is excessively consumed.

According to one or more embodiments, there is provided information about various pricing systems can be provided to power consumers.

Furthermore, it is possible to display information about current power rates and current power consumption such that power consumers can check the information and efficiently use power.

According to another aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
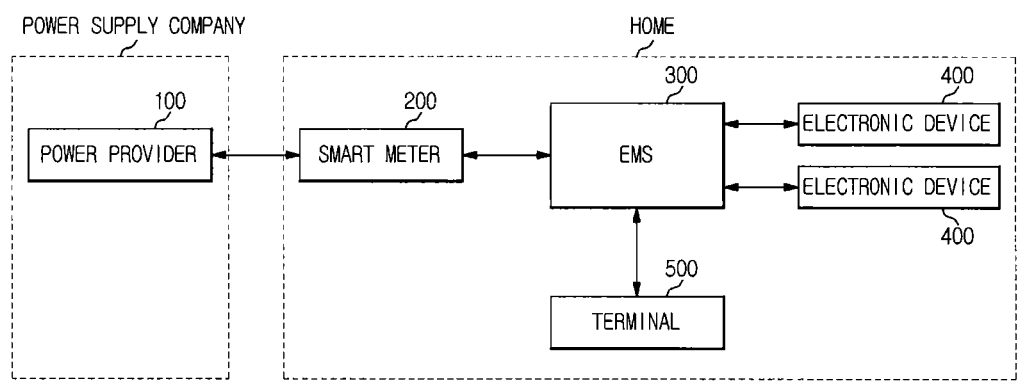
FIG. 1 is a block diagram showing a configuration of a power management system according to an embodiment.

Reference will now be made in detail to embodiments, examples of which are illustrated in the accompanying drawings, wherein like reference numerals refer to like elements throughout.

FIG. 1 is a block diagram showing a configuration of a power management system according to an embodiment.

Referring to FIG. 1, the power management system includes a power provider 100, a smartmeter 200, an energy management system (EMS), an electronic device 400, and a terminal 500.

The power provider 100 is a power supply source that is driven by a power supply company (utility company) so as to generate and provide power. The power provider 100 generates the power through atomic energy, hydroelectric power, thermal power, wind power, etc., and provides the generated power to the electronic device 400 installed in a home of an electricity consumer (hereinafter referred to as a 'consumer').

The power provider 100 generates a predetermined amount of power every hour and provides the generated power to the electronic device 400. However, the amount of power consumed in each home (hereinafter referred to as 'power consumption') may change by season and time periods. For example, power consumption of each home is high at dawn or in the morning and low in the afternoon or evening in a day. Furthermore, the power consumption of each home is relatively low in the spring and fall and relatively high in the summer and winter.

Accordingly, the power provider 100 sets power rates corresponding to a low power consumption period to be lower than power rates corresponding to a high power consumption period, sets power rates corresponding a low power consumption season to be lower than power rates corresponding a high power consumption season, and provide electric power to each home based on the set power rates. That is, the power provider 100 can balance supply and consumption of power by elastically setting power rates in response to power consumption of each home and supplying power to each home on the basis of the elastically set power rates.

In addition, the power provider 100 can predict power rates on the basis of the generated amount of electric power, the past power use information for every season and every time period, and weather information, and determines power rates on the basis of the predicted power consumption. In this case, the power provider 100 may also be possible to establish power rate levels corresponding to predicted power rates. For example, when the power rate levels classified into four levels, power rates per kwh decrease as power rate level decreases. Specifically, if power rates per kwh is in the range of 1 won to 100 won, a power rate level corresponding thereto may correspond to a first power rate level (hereinafter referred to as 'level 1') from among the four power rate levels. If power rates per kwh is in the range of 101 won to 200 won, a power rate level corresponding thereto may correspond to a second power rate level (hereinafter referred to as 'level 2') from among the four power rate levels. When power rates per kwh is in the range of 201 Won to 300 Won, a power rate level corresponding thereto may correspond to a third power rate level (hereinafter referred to as 'level 3') from among the four power rate levels. If power rates per unit power is in the range of 301 Won to 400 Won, a power rate level corresponding to this power rates may correspond to a fourth power rate level (hereinafter referred to as 'level 4') from among the four power rate levels.

The power provider 100 collects power consumption amounts of individual homes classified according to individual power rate levels, and stores the collected power consumption information according to individual power rate levels, such that the power supply company calculates power rates depending upon power consumption of each home on a monthly basis, and charges each home the calculated power rates on a monthly basis.

The power provider 100 compares the periodically calculated power rates with predetermined monthly power rates so as to decide a limited amount of power to be supplied to each home. If the calculated power rates are higher than the predetermined monthly power rates, information about the excess of the predetermined monthly power rates is transmitted to the EMS 300 installed in the corresponding home, such that an event indicating the excess of predetermined monthly power rates is generated through the EMS 300 installed in each home.

The power provider 100 can store a threshold power amount for each home, compare a power consumption amount of each home with the threshold power amount, and thus decides the limitation of power supply. In this way, the power provider 100 can manage the power demand of each home on the basis of the threshold power amount or the predetermined monthly power rates. The threshold power amount may be determined by the power supply company or by a contract between the power supply company and each home. The monthly power rates of each home can be set by a contact between the power supply company and each home.

The power provider 100 can store information about a power consumption state of each consumer and manage the stored information. The power consumption state may include the details of generation of an event indicating excess of the threshold power amount and the details of generation of an event indicating excess of the monthly power rates.

The power provider 100 is connected to the smartmeter 200, the EMS 300, and the electronic device 400, installed in each home, over a network, such that the power provider 100 transmits and receives data regarding power demand management (referred to as 'power management data' hereinafter) over the network. This network may be any of a wired network, a wireless network, a wired/wireless hybrid network, etc. The power management data can include at least one of current power rates, power rate levels corresponding to power rates, an electric power pricing system used by a consumer, the amount of power used by the consumer so far, power rates corresponding to the amount of power used by the consumer so far, average power consumption of the consumer, average power rates of the consumer, and average power consumption of a neighbor. The average power consumption or average power rates may be calculated on a monthly basis, time period basis or an hourly basis.

Power pricing includes a gradation system, real time pricing (RTP), two-part RTP, peak pricing, time of use (TOU), and TOU+Block pricing.

The gradation system increases power rates depending on power consumption. In Korea, power rates are classified into home power rates, general power rates, educational power rates, and industrial power rates and differential power rates are applied. The gradation system is applied only to the home rates. The home power rates are classified into basic rates and consumption rates each being divided into 6 levels according to power consumption amount.

The RTP refers a pricing system in which power rates change for each time period on the basis of wholesale price or retail price. While the RTP and TOU are similar to each other in that power rates change for each time period, the RTP variably sets power rates according to energy management system and power supply and demand, distinguished from the TOU. Accordingly, the RTP needs to provide variable rates to consumers in real time (at an interval of 5 minutes at minimum). The RTP can increase benefits of both a power provider and a power consumer when the consumer economically uses power although it has higher volatility than fixed rate pricing. The RTP sets a customer baseline load (CBL) and standard rates, applies the standard rates to power consumption that is lower than the CLB and applies power rates according to RTP to power consumption that exceeds the CBL, thereby mitigating price volatility.

The TOU applies differential power rates based on on-peak and off-peak or on-peak, intermediate and off-peak when power consumption largely changes according to season and time. The TOU is used in many countries and is applied to a lot of homes in Korea. It divides time into three time periods on the basis of power consumption for spring/fall, summer and winter and applies differential power rates in the time periods.

The TOU+Block pricing changes power rates depending on consumption for each time period.

Figure 2:
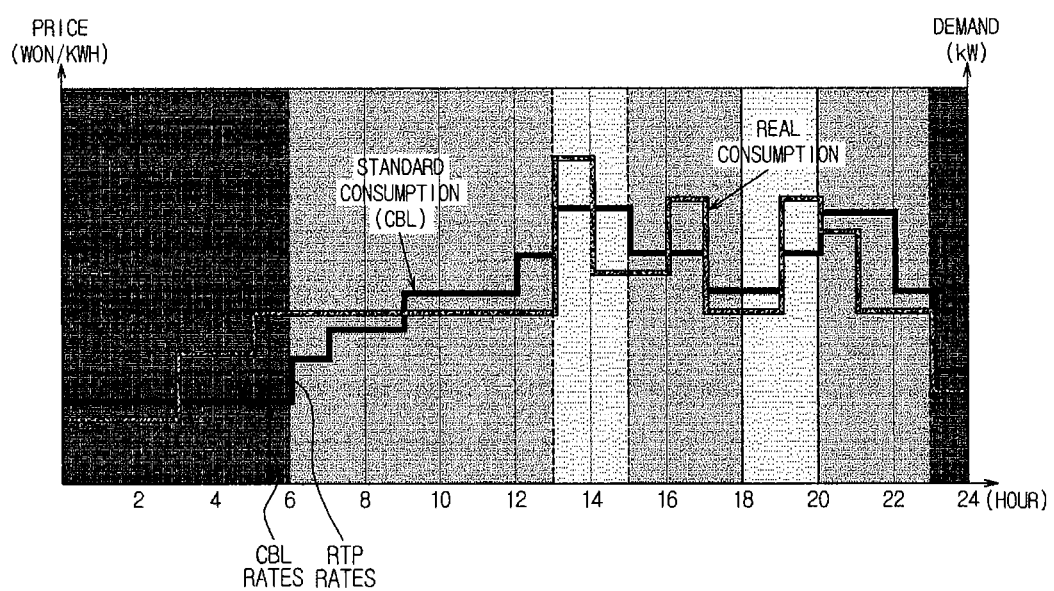
FIG. 2 illustrates two-part real time pricing (RTP) from among pricing systems.

The two-part RTP is distinguished from the TOU+Block pricing in that CBL rates (that is, standard rates) are determined in advance and power rates are set according to RTP when power consumption exceeds CBL (that is, standard consumption). FIG. 2 illustrates the two-part RTP. Referring to FIG. 2, a CLB is set for each time period. CBL rates dl are applied to power consumption lower than the CBL whereas power rates are set according to RTP for power consumption that exceeds the CBL.

Peak pricing is a system in which the power supply company notifies a consumer of peak power rates corresponding to a time period in which power demand is high and enforces the pricing. The peak pricing can be combined with the TOU and applied to a limited time in a year. The peak pricing is enforced by European and American power companies.

Referring back to FIG. 1, the smartmeter 200 is a watt-hour meter installed in each home and can communicate with the power provider 100 and the EMS 300 in a wired or wireless manner. Specifically, the smartmeter 200 can receive power management data from the power provider 100 and transmit the received power management data to the EMS 300. The smartmeter 200 may include a display (not shown) such as a liquid crystal display (LCD), such that the power management data can be displayed through the display. For example, the display can display the power consumption amount of a corresponding home or power rates received from the power provider 100.

The EMS 300 can communicate with the smartmeter 200. Specifically, the EMS 300 can receive power management data from the smartmeter 200, analyze the received power management data to check a power pricing system currently used by a consumer, generate a power management screen according to the checking result and display the power management screen.

More specifically, when the pricing system currently used by the consumer is a pricing system in which power rates change depending on power consumption, the EMS 300 can create a power management screen that indicates the amount of power consumed so far and display the power management screen. In addition, the EMS 300 can display a power rate level corresponding to current power rates on the power management screen.

The EMS 300 can control operation of the electronic device 400 on the basis of power rates. To achieve this, the EMS 300 can communicate with the electronic device 400 in a wired or wireless manner. The EMS 300 will be described in more detail later with reference to FIG. 3.

The terminal 500 is a device capable of performing communication and display. Examples of the terminal 500 include personal digital assistants (PDA), a mobile communication terminal such as a cellular phone, a personal computer, a laptop computer, a television receiver, etc. The terminal 500 can communicate with the EMS 300 in a wired or wireless manner.

The power management system according to an embodiment has been described with reference to FIG. 1. While the smartmeter 200, the EMS 300 and the terminal 500 are implemented as separate modules in the above description, the EMS 300 can be integrated into the smartmeter 200 or integrated into the terminal 500.

Figure 3:
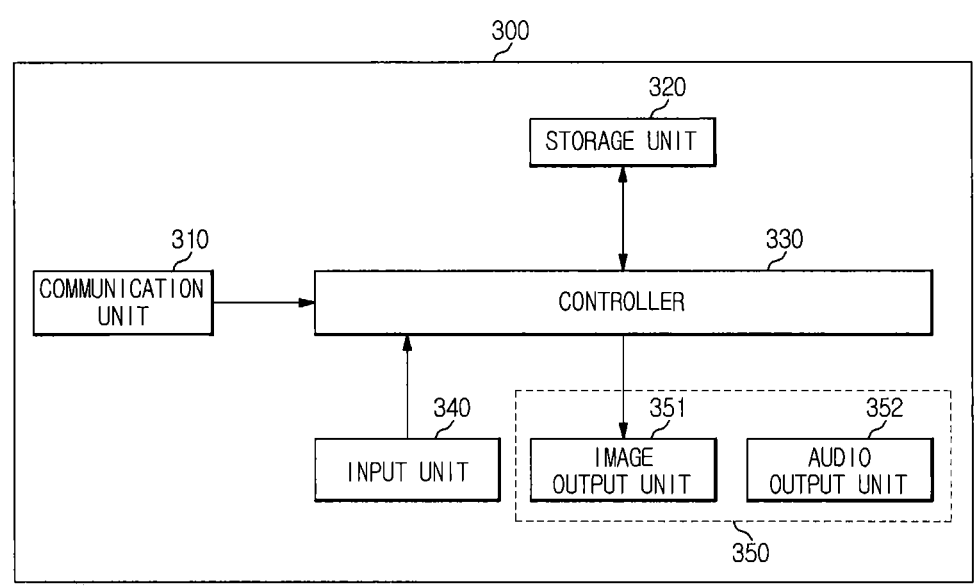
FIG. 3 is a block diagram showing a configuration of a power management apparatus according to an embodiment.

FIG. 3 is a block diagram showing a configuration of the EMS 300 according to an embodiment. Referring to FIG. 3, the EMS 300 can include a communication unit 310, a storage unit 320, a controller 330, an input unit 340, and an output unit 350, which includes an image output unit 351 and an audio output unit 352.

The communication unit 310 can communicate with the smartmeter 200. Specifically, the communication unit 310 can receive power management data from the smartmeter 200. As described above, the power management data can include at least one of current power rates, a price level corresponding to power rates, a pricing system used by a consumer, the amount of power consumed by the consumer so far, power rates corresponding to the amount of power consumed by the consumer so far, average power consumption of the consumer, average power rates of the consumer, and average power consumption of a neighbor of the consumer. The average power consumption and the average power rates may be calculated on a monthly basis, a time-period basis, or an hourly basis.

The controller 330 can analyze the power management data received through the communication unit 310 and generate a power management screen depending on the analysis result. The power management screen according to an embodiment can include at least one of a clock window and an information window. The clock window and the information window are described with reference to FIGS. 4, 5 and 6.

Figure 4:
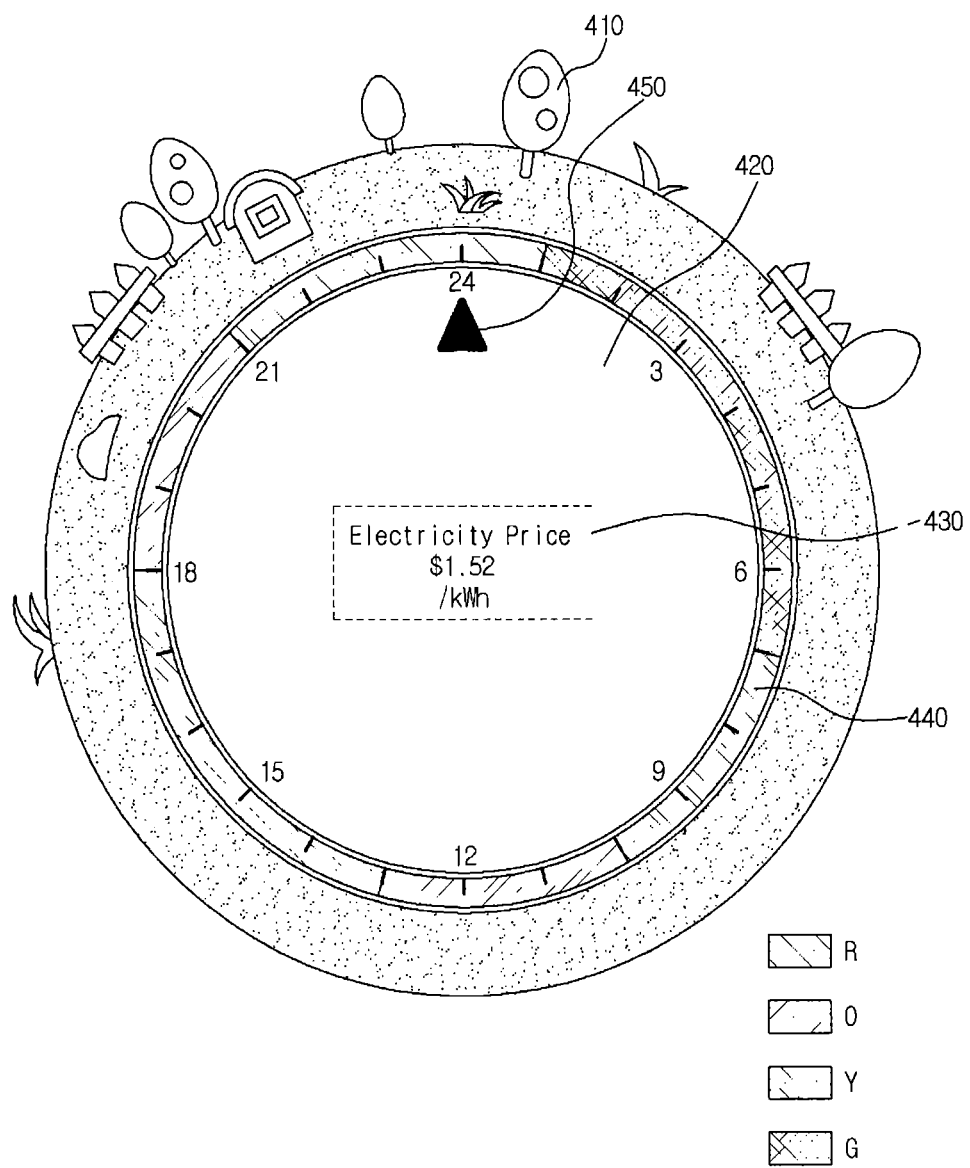
FIGS. 4 to 8 show exemplary power management screens displayed through the power management apparatus of FIG. 2.

FIG. 4 shows an exemplary power management screen including a clock window 420. The clock window 420 can be implemented in a circular or polygonal shape. The clock window 420 can indicate divisions, provided to indicate time, and an indicator 450, provided to point to the current time, and additionally indicate at least one of a current electricity price 430 and a price level 440 corresponding to an electricity price. Referring to FIG. 4, the current electricity price 430 is displayed at the center of the clock window 420. The price level 440 is displayed on the edge of the clock window 420 for each time period. In FIG. 4, 'R', 'O', 'Y' and 'G' respectively represent red, orange, yellow and green. The price level 440 can decreases in the order of R, O, Y and G.

Figure 6:
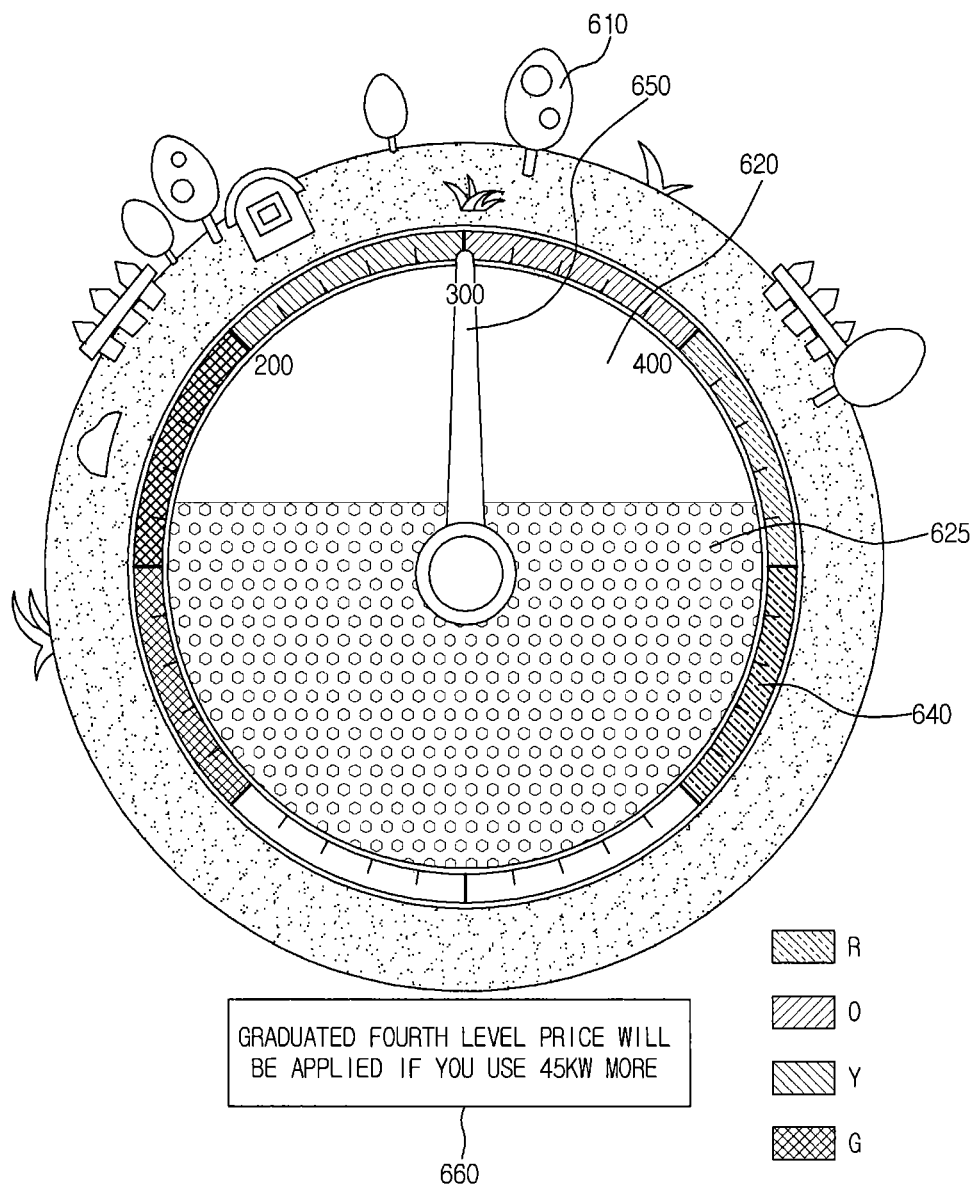

FIG. 6 shows an exemplary power management screen including a clock window 620 and an information window 660. Referring to FIG. 6, the clock window 620 indicates division, provided to indicate power consumption other than time, and an indicator 650, provided to point to the amount of poser consumed so far, and a price level 640 is indicated on the edge of the clock window 620 for each time period. Furthermore, the amount of power consumed so far may be indicated at an inside part of the clock window 620. According to an embodiment, the amount of power consumed so far can be indicated by expressing a lower part of the clock window 620 in a color different from the color of an upper part thereof. The area of the lower part of the clock window 620 represented in a color different from the upper part thereof can gradually increase in proportion to the amount of power consumed so far. Otherwise, the height of the lower part can increase in proportion to the amount of power consumed so far. The information window 660 can display information about the amount of power available before an electricity price of the next level is applied. The information window 660 can be displayed at the left, right, top, bottom or center of the clock window 620 such that it does not overlap with the clock window 620.

Referring back to FIG. 3, the controller 330 can analyze the power management data and generate the power management screen as described above according to the analysis result. Specifically, the controller 330 can analyze the power management data to check an electricity pricing system currently used by the consumer and generate a power management screen corresponding to the checked result.

For example, if the consumer currently uses RTP, the controller 330 can check whether there is a previous day's notification for power rates.

If the previous day's notification is present and a future electricity price can be predicted, the controller can create the clock window 420 that indicates the price level 440 corresponding to future 12 hours or 24 hours on the basis of the current time, as shown in FIG. 4. In this case, the price level 440 indicates a power rate level. Price levels can be indicated in different colors. For example, price levels are classified as four levels, a price level corresponding to a highest electricity price can be indicated in red, a price level corresponding to a lowest electricity price can be indicated in green, and price levels corresponding to middle electricity prices can be indicated in orange and yellow. The price level 440 can be indicated on the edge of the clock window 420, as shown in FIG. 4. Alternatively, the price level 440 can be indicated in the shape of a fan in the clock window 420.

Figure 5:
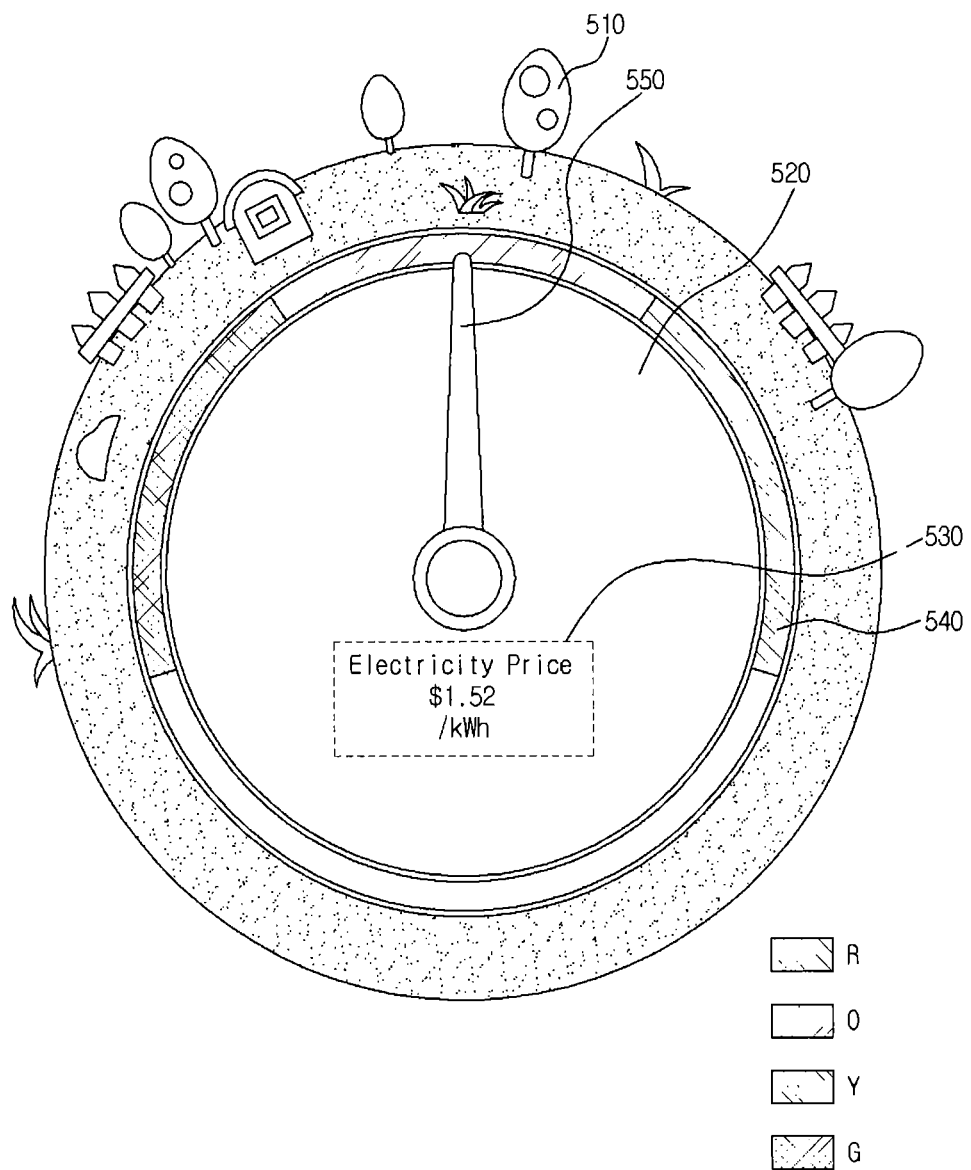

If the controller 330 cannot predict the future electricity price since there is no previous day's notification, the controller 330 can generate a clock window 520 that indicates only a current electricity price 530 and a price level 540 corresponding to the current electricity price 430, as shown in FIG. 5. In this case, the clock window 520 may include an indicator 550 pointing to the price level 540.

When the pricing system currently used by the consumer is a pricing system in which power rates change depending on power consumption, the controller 330 can create a clock window having an inside part filled in proportion to the amount of power consumed so far.

For example, if the consumer currently uses the gradation system, the controller 330 can generate the clock window 620 having an inside part filled in proportion to the amount of power consumed so far, as shown in FIG. 6. The controller 330 can generate the information window 660 that displays information about the amount of power available before the electricity price of the next level is applied. Accordingly, the consumer can easily be aware of the power consumption of this month by checking a degree by which the inside part, that is, the lower part 625 of the clock window 620 is filled. Furthermore, the consumer can easily recognize the amount of remaining power available before the electricity price of the next level is applied by checking the information window 660.

Figure 7:
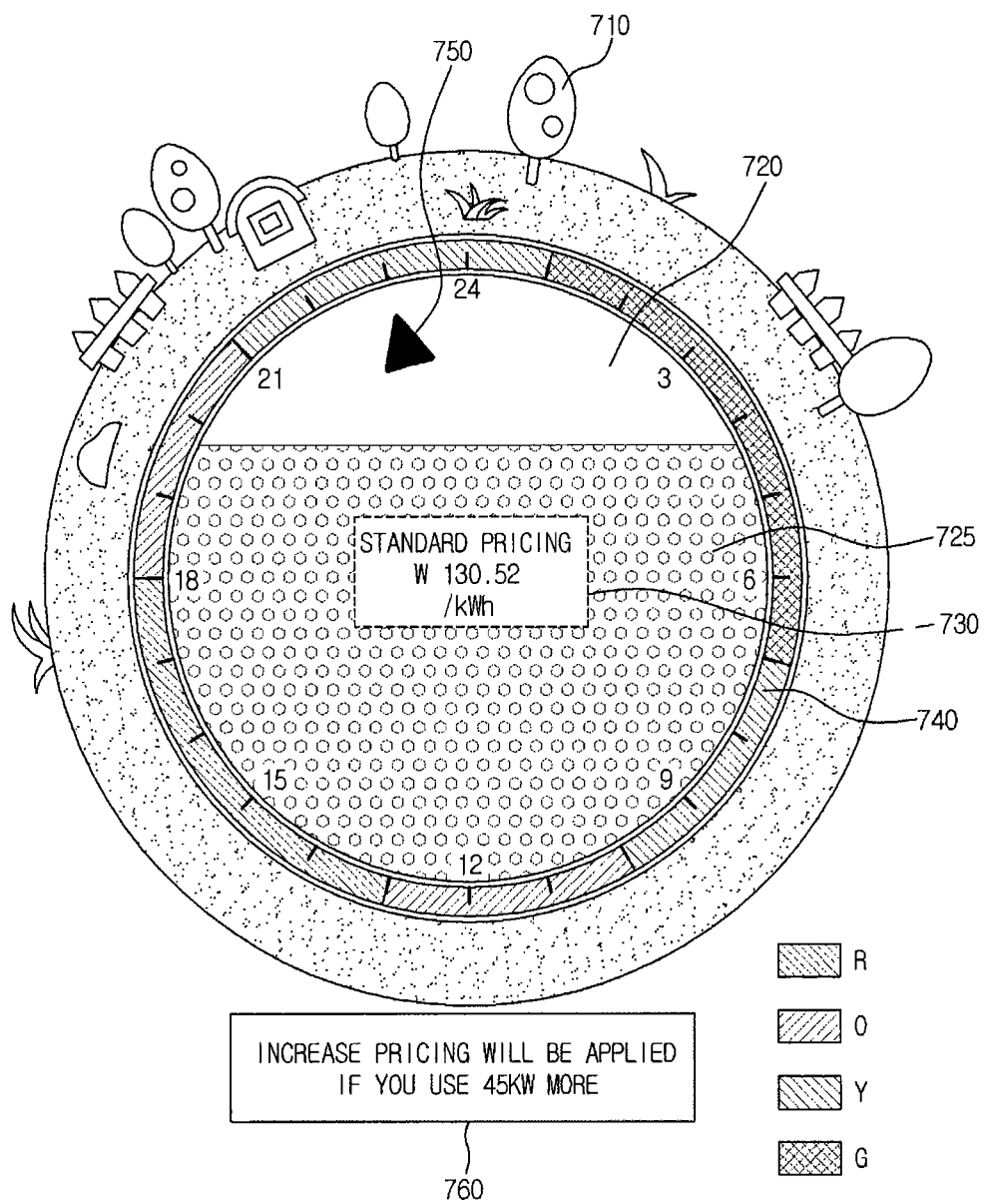

Alternatively, if the power pricing system currently used by the consumer is two-part RTP or TOU, the controller 330 can generate a clock window 720 having an inside part filled in proportion to power consumption per hour, as shown in FIG. 7. In this case, an indicator 750 pointing to time may be shown on the inside part of the clock window 720. In addition, information 730 about the currently used pricing system can be displayed at the center of the clock window 720. It can be seen from FIG. 7 that the currently applied pricing system is basic pricing, which indicates that the consumer has consumed the amount of power, which is lower than CBL, so far. The controller 330 can create an information window 760 that displays the amount of power available before the electricity price of the next level is applied in addition to the clock window 720. Accordingly, the consumer can easily be aware of the power consumption per hour by checking a degree by which the inside part of the clock window 720 is filled. A lower part of the clock window 720 is denoted by 725. Furthermore, the consumer can easily recognize the amount of remaining power available before the electricity price of the next level is applied by checking the information window 760.

The controller 330 can determine whether power is excessively consumed by analyzing the power management data in addition to creation of the power management screen. The controller 330 may generate an alarm according to the determination result.

For example, the controller 330 can compare the amount of power consumed by the consumer so far with previous power consumption of the consumer in order to determine whether power is excessively consumed. In this case, the controller 330 can compare the amount of power consumed by the consumer so far with previous power consumption of the consumer on a monthly basis, a time period basis or an hourly basis. When the amount of power consumed by the consumer so far exceeds the previous power consumption of the consumer, the controller 330 can generate an alarm indicating excessive power consumption. The alarm can be generated according to a method previously set by the consumer. Specifically, if the consumer sets an alarm method as a short message service, the controller 330 can transmit a short message to a cellular phone (not shown) of the consumer.

Alternatively, the controller 330 can compare the amount of power consumed by the consumer so far with the amount of power consumed by a neighbor of the consumer so far in order to determine whether power is excessively consumed. In this case, the controller 330 can compare the amount of power consumed by the consumer so far with the amount of power consumed by the neighbor so far on a monthly basis, a time period basis or a hourly basis. When the amount of power consumed by the consumer so far exceeds the amount of power consumed by the neighbor so far, the controller 330 can generate an alarm indicating excessive power consumption. The alarm can be generated according to a method previously set by the consumer.

Figure 8:
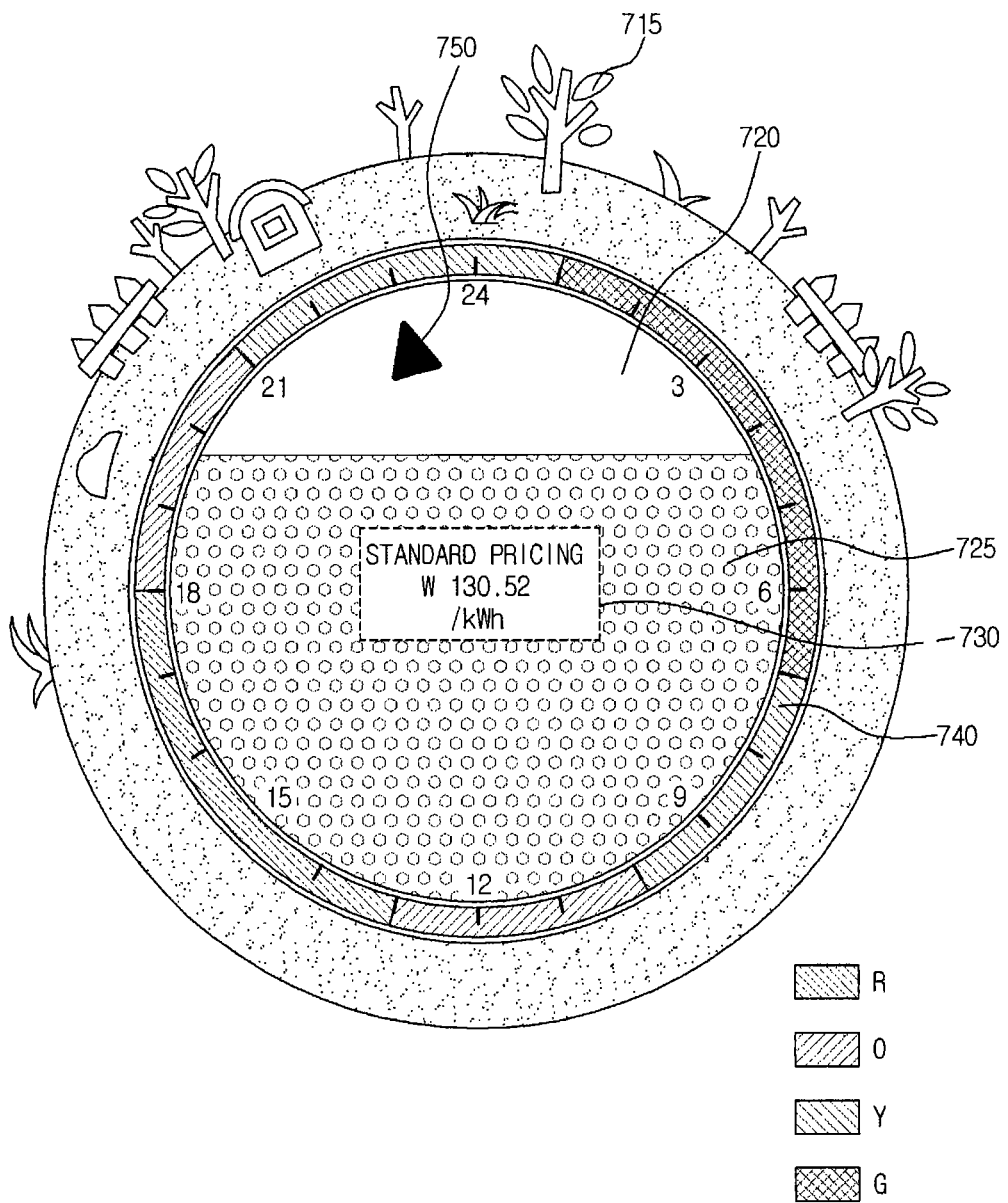

Specifically, if the consumer sets an alarm method as a short message service, the controller 330 can control components of the EMS 300 such that a short message is transmitted to the terminal 300, for example, a cellular phone, of the consumer. If the consumer sets the alarm method as e-mail, the controller 330 can control the components of the EMS 300 such that an alarm mail indicating excessive power consumption is delivered to a previously registered e-mail address. If the consumer sets an emoticon as the alarm method, the controller 330 informs the consumer of excessive power consumption by changing the shape of the emoticon. For example, emoticons 410, 510, 610 and 710 in the form of a tree thick with leaves are displayed, as shown in FIGS. 4, 5, 6 and 7, when power is not excessively consumed and, in the event of excessive power consumption, an emoticon 715 in the form of a tree in FIG. 8 having a remarkably reduced number of leaves is displayed. In this manner, the consumer can recognize environmental problems due to excessive power consumption.

Referring back to FIG. 3, the storage unit 320 can store the power management data received through the communication unit 310. In addition, the storage unit 320 can store an algorithm or data necessary for the controller 330 to analyze the power management data, data necessary for the controller 330 to create the power management screen, etc. The storage unit 320 can be implemented as a non-volatile memory such as a read only memory (ROM), an electrically erasable programmable ROM (EEPROM), a flash memory, etc., a volatile memory such as a random access memory (RAM), a storage medium such as a hard disc drive (HDD), or a combination of a non-volatile memory and a volatile memory.

The input unit 340 can receive a command from a user. For example, the input unit 340 can receive a command relating to choice of an option for the power management screen. Options with respect to the power management screen can include display of an information window and an alarm method for indicating excessive power consumption. That is, the user can select display of the information window on the power management screen through the input unit 340.

Furthermore, the user can select generation of an alarm through the input unit 340 when power is excessively consumed. If the alarm indicating excessive power consumption is generated, the user can select which one of an emoticon, pop-up, sound, short-message service (SMS), and e-mail is used to represent the alarm. In this case, the user can select only one of these alarm methods or multiple alarm methods. To receive the command for selecting an option with respect to the power management screen from the user, the input unit 340 can include a plurality of keys or buttons. The keys or buttons can be implemented as hardware or software such as a graphical user interface. Otherwise, they can be implemented as a combination of hardware and software.

The output unit 350 outputs a command processed result as a sound, text, still image or moving image. To achieve this, the output unit 350 can include at least one of an image output unit 351 such as an LCD and an audio output unit 352 such as a speaker.

The image output unit 351 can output the power management screen including a clock window. In this case, the power management screen may include an information window according to an option previously selected by the user. If the user selects an emoticon or pop-up as an alarm method for indicating excessive power consumption, the image output unit 351 may display the emoticon or pop-up that indicates excessive power consumption.

The audio output unit 352 can output an alarm indicating excessive power consumption as a sound.

The output unit 350 may be implemented as hardware separately from the input unit 340, or integrated with the input unit 340 as a touchscreen or touchpad.

Figure 9:
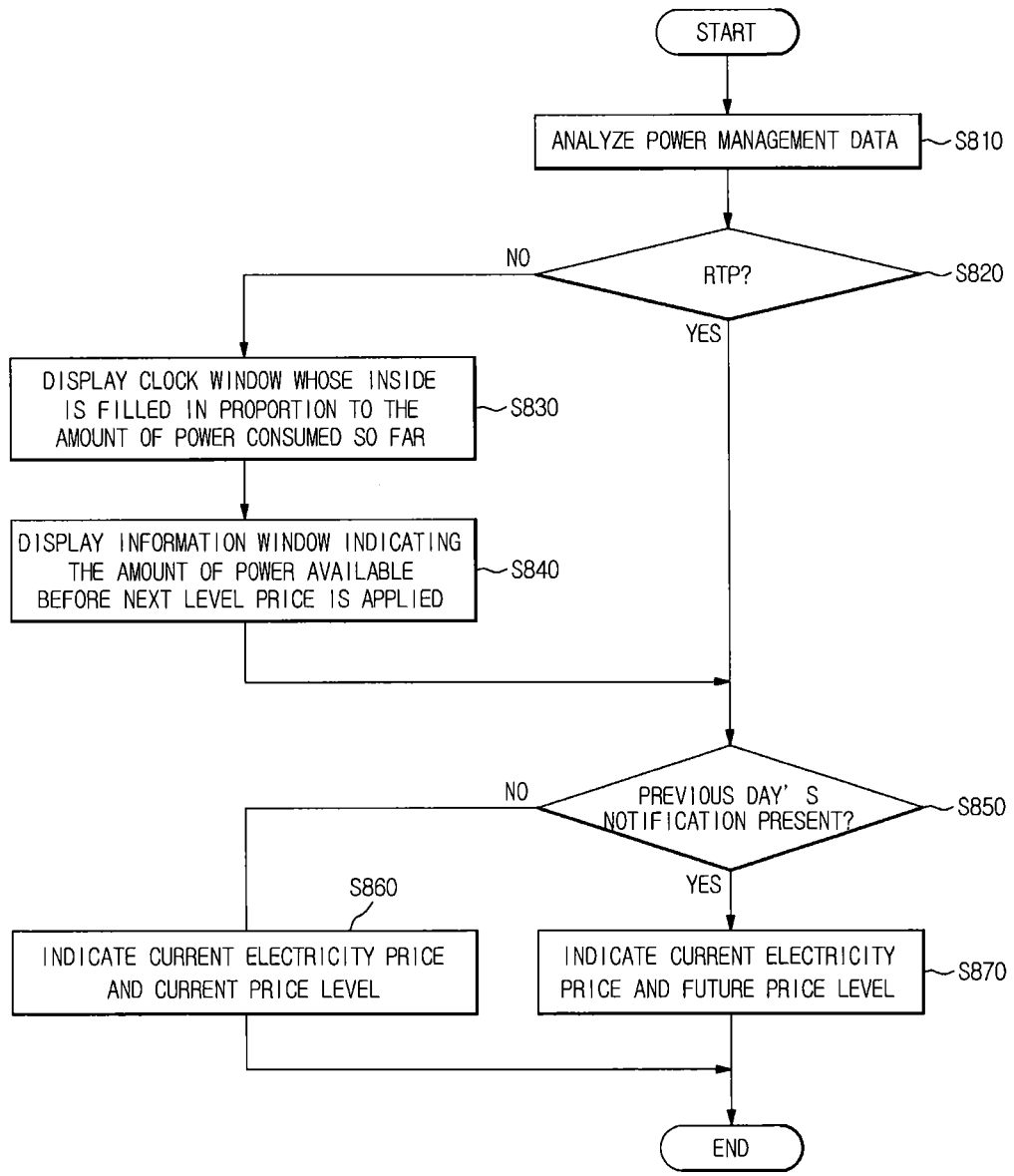
FIG. 9 is a flowchart showing a power management method according to an embodiment.

FIG. 9 is a flowchart illustrating a power management method according to an embodiment.

The EMS 300 receives power management data from the power provider 100. The power management data can include at least one of current power rates, a pricing system used by a consumer, the amount of power consumed by the consumer so far, rates of power consumed by the consumer so far, average monthly power consumption of the consumer, average monthly power rates of the consumer, and information about average monthly power consumption of a neighbor of the consumer.

The EMS 300 analyzes the received power management data (S810) and checks if a pricing system currently used by a consumer is RTP (S820).

If the pricing system currently used by the consumer is not RTP (S820), that is, if the consumer uses a pricing system in which power rates change depending on power consumption, such as a gradation system, two-part RTP, peak pricing, TOU, and TOU+Block pricing, the EMS 300 can create a clock window having an inside part filled in proportion to the amount of power consumed so far and output the clock window through the output unit 350 (S830).

In addition, the EMS 300 can generate an information window that displays the amount of power available before an electricity price of the next level is applied and display the information window through the output unit 350 (S840).

Then, the EMS 300 can determine whether there is a previous day's notification for power rates (S850).

If it is possible to predict future power rates since the previous day's notification is present (S850, YES), the controller 330 can generate a clock window that indicates price levels of future 12 or 24 hours on the basis of the current time, as shown in FIG. 4 (S870). The price levels can be classified into four levels. In this case, a price level corresponding to a highest electricity price can be indicated in red, a price level corresponding to a lowest electricity price can be indicated in green, and price levels corresponding to middle electricity prices can be indicated in orange and yellow. The price levels can be indicated on the edge of the clock window, as shown in FIG. 4, or indicated in the shape of a fan in the clock window.

If it is impossible to predict the future electricity price since the previous day's notification is not present (S850, NO), the controller 330 can generate a clock window that indicates only the current electricity price and a price level corresponding to the current electricity price, as shown in FIG. 5 (S860).

The power management apparatus and method according to embodiments have been described. While the power management screen is displayed through the output unit 350 of the EMS 300 in the above description, embodiments are not limited thereto and the power management screen can be transmitted to the terminal 500 and displayed through the terminal 500. If the electronic device 400 includes a display, the power management screen can be transmitted to the electronic device 400 and displayed through the electronic device 400.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A power management apparatus comprising:
   a communication unit to receive power management data including information about a pricing system being used by a consumer of power;
   a controller to create a power management screen on which an amount of power consumed is displayed according to the pricing system being used by the consumer; and
   an output unit to output the power management screen,
   wherein:
   the power management screen is configured to adjust between the pricing system being used by the consumer being a real time pricing system in which power rates change for each time period on a basis of wholesale price or retail price and the pricing system being used by the consumer being a power consumption pricing system which is a gradation system which increases power rates depending on an amount of power consumption,
   the power consumption pricing system is a pricing system in which power rates change in response to power consumption of the consumer, and
   the controller adjusts between the real time pricing system and the power consumption pricing system based on the power management data received from the communication unit.

2. The power management apparatus according to claim 1, wherein the power management data comprises at least one of current power rates, a price level corresponding to the current power rates, the pricing system being used by the consumer, the amount of power consumed by the consumer, power rates corresponding to the amount of power consumed by the consumer, average power consumption of the consumer, average power rates of the consumer, and average power rates of a neighbor of the consumer.

3. The power management apparatus according to claim 1, wherein the power management screen comprises a clock window having an inside part filled depending on the amount of power consumed when the pricing system being used by the consumer is the power consumption pricing system.

4. The power management apparatus according to claim 3, wherein the power management screen further comprises an information window displaying information about an amount of remaining power available before an electricity price of a next price level is applied when the pricing system being used by the consumer is the power consumption pricing system.

5. The power management apparatus according to claim 3, wherein a price level corresponding to a current electricity price is indicated on an edge of the clock window.

6. The power management apparatus according to claim 3, wherein a price level corresponding to a current electricity price is indicated in a fan shape in the inside part of the clock window.

7. The power management apparatus according to claim 1, wherein when the amount of power consumed by the consumer exceeds an average power consumption of the consumer, the controller determines that power is excessively consumed and generates an alarm indicating the excessive power consumption.

8. The power management apparatus according to claim 1, wherein when the amount of power consumed by the consumer exceeds an average power consumption of a neighbor of the consumer, the controller determines that power is excessively consumed and generates an alarm indicating the excessive power consumption.

9. The power management apparatus according to claim 8, wherein the alarm comprises at least one of an emoticon, pop-up, a sound, a short message service, and e-mail.

10. The power management apparatus according to claim 9, wherein when the alarm includes an emoticon, the controller displays the emoticon in the form of a tree thick with leaves before determining that power is excessively consumed and displays the emoticon in the form of the tree having a reduced number of leaves upon determining that power is excessively consumed.

11. A power management method comprising:
receiving power management data including information about a pricing system being used by a consumer of power;
creating, using at least one processor, a power management screen on which an amount of power used is displayed according to the pricing system being used by the consumer; and
outputting the power management screen,
wherein:
the power management screen is configured to adjust between the pricing system being used by the consumer being a real time pricing system in which power rates change for each time period on a basis of wholesale price or retail price and the pricing system being used by the consumer being a power consumption pricing system which is a gradation system which increases power rates depending on an amount of power consumption,
the power consumption pricing system is a pricing system in which power rates change in response to power consumption of the consumer, and
the at least one processor adjusts between the real time pricing system and the power consumption pricing system based on the received power management data.

12. The power management method according to claim 11, wherein the power management data comprises at least one of current power rates, a price level corresponding to the current power rates, the pricing system being used by the consumer, the amount of power consumed by the consumer, power rates corresponding to the amount of power consumed by the consumer, average power consumption of the consumer, average power rates of the consumer, and average power rates of a neighbor of the consumer.

13. The power management method according to claim 11, wherein the power management screen comprises a clock window having an inside part filled depending on the amount of power consumed when the pricing system being used by the consumer is the power consumption pricing system.

14. The power management method according to claim 13, wherein the power management screen further comprises an information window displaying information about an amount of remaining power available before an electricity price of a next price level is applied when the pricing system being used by the consumer is the power consumption pricing system.

15. The power management method according to claim 13, wherein a price level corresponding to a current electricity price is indicated on an edge of the clock window.

16. The power management method according to claim 13, wherein a price level corresponding to a current electricity price is indicated in a fan shape in the inside part of the clock window.

17. The power management method according to claim 11, wherein when the amount of power consumed by the consumer exceeds an average power consumption of the consumer, the creating of the power management screen comprises determining that power is excessively consumed and generating an alarm indicating the excessive power consumption.

18. The power management method according to claim 11, wherein when the amount of power consumed by the consumer exceeds an average power consumption of a neighbor of the consumer, the creating of the power management screen comprises determining that power is excessively consumed and generating an alarm indicating the excessive power consumption.

19. The power management method according to claim 18, wherein the alarm comprises at least one of an emoticon, pop-up, a sound, a short message service, and e-mail.

20. The power management method according to claim 19, wherein when the alarm includes an emoticon, the generating of the alarm indicating the excessive power consumption comprises displaying the emoticon in the form of a tree thick with leaves before determining that power is excessively consumed and displaying the emoticon in the form of the tree having a reduced number of leaves upon determining that power is excessively consumed.

21. At least one computer readable medium storing computer readable instructions that control at least one processor to implement the method of claim 11.

* * * * *